(12) United States Patent
Kuechler

(10) Patent No.: US 7,629,562 B2
(45) Date of Patent: Dec. 8, 2009

(54) SENSOR ARRANGEMENT IN MOTOR VEHICLE EXTERIOR MIRROR

(75) Inventor: Wolfgang Kuechler, Ostheim (DE)

(73) Assignee: PRKH GmbH (DE)

( * ) Notice: Subject to any disclaimer, the term of this patent is extended or adjusted under 35 U.S.C. 154(b) by 0 days.

(21) Appl. No.: 11/850,009

(22) Filed: Sep. 4, 2007

(65) Prior Publication Data
US 2008/0042053 A1 Feb. 21, 2008

Related U.S. Application Data

(63) Continuation of application No. PCT/EP2006/001726, filed on Feb. 24, 2006.

(30) Foreign Application Priority Data
Mar. 1, 2005 (DE) .................... 10 2005 009 120

(51) Int. Cl.
G01C 21/02 (2006.01)
(52) U.S. Cl. .............. 250/203.4; 340/449; 340/501
(58) Field of Classification Search ........ 250/203.1, 250/203.3, 203.4, 221; 126/573; 236/91 C; 340/438, 449, 501, 522
See application file for complete search history.

(56) References Cited

U.S. PATENT DOCUMENTS

| | | | |
|---|---|---|---|
| 5,555,136 A | 9/1996 | Waldmann et al. | |
| 5,659,423 A | 8/1997 | Schierbeek et al. | |
| 5,957,375 A * | 9/1999 | West | 236/91 C |
| 2004/0099786 A1 | 5/2004 | Wen-Wei et al. | |
| 2004/0121820 A1 | 6/2004 | Noriyuki et al. | |
| 2005/0200467 A1* | 9/2005 | Au et al. | 340/465 |

FOREIGN PATENT DOCUMENTS

| | | |
|---|---|---|
| DE | 19544893 | 5/1995 |
| DE | 10221129 | 4/2003 |
| JP | 2004196243 A * | 7/2004 |

* cited by examiner

*Primary Examiner*—Kevin Pyo
(74) *Attorney, Agent, or Firm*—Cantor Colburn LLP

(57) ABSTRACT

A sensor arrangement is provided that includes at least one sun sensor in a motor vehicle, wherein the sun sensor is used in the region of the outside surface of the motor vehicle, and the sun sensor is mounted in the area of at least one exterior mirror.

4 Claims, 1 Drawing Sheet

SENSOR ARRANGEMENT IN MOTOR VEHICLE EXTERIOR MIRROR

This nonprovisional application is a continuation of International Application No. PCT/EP2006/001726, which was filed on Feb. 24, 2006, and which claims priority to German Patent Application No. DE 10 2005 009 120.2, which was filed in Germany on Mar. 1, 2005, and which are both herein incorporated by reference.

BACKGROUND OF THE INVENTION

1. Field of the Invention

The present invention relates to a sensor arrangement with one or more sun sensors in a motor vehicle, wherein the sensor arrangement is used in the region of the outside surface of the motor vehicle.

2. Description of the Background Art

Oftentimes, it is desirable in motor vehicles to determine the direction and intensity of incident solar radiation. This information can be used to especially good effect for regulating a multi-zone air conditioning system that is capable of individually air-conditioning different passenger compartment areas of a motor vehicle.

From DE 195 44 893 C2 is known a sun sensor arrangement subdivided into four quadrants. The solar radiation sensor system consists of a sensor subdivided into four quadrants that has a separate sensor element in each quadrant for detecting the incident solar radiation in the associated solid angle range. The sensor here is located in the roof area. However, such an arrangement has the disadvantage that the vehicle roof must be provided with a hole, which on the one hand can make it easy for the sensor to be damaged, and on the other hand results in increased expense for sealing the opening. Moreover, an arrangement of the sensor in the roof area is not always desirable for design reasons.

SUMMARY OF THE INVENTION

It is therefore an object of the present invention to provide a sensor arrangement with which the largest possible solid angle range around the motor vehicle is sensed, and which has the least possible effect on the design and construction of the motor vehicle. Moreover, the sensor system should be capable of measuring and analyzing the intensity of incident solar radiation on the motor vehicle as a function of the orientation of the vehicle without producing overlaps in the solid angle ranges sensed by the sensors.

In the inventive arrangement of the sun sensors, at least one sun sensor is mounted in the area of at least one exterior mirror. In order to arrange the sun sensor in the area of the incident light from the sun, the sun sensor or sun sensors is or are preferably placed in the area of the outer surface of the exterior mirror. Due to the position of the exterior mirror relative to the vehicle body, a sun sensor placed there can cover at least one half of the hemisphere above a vehicle side. In this context, hemisphere refers to the hemisphere above the motor vehicle from which direct solar radiation is typically incident.

Another advantage of positioning the sun sensor in the exterior mirror results from the shadow cast by the vehicle. Sunlight from an area on the opposite side of the motor vehicle does not reach the sun sensor, or is in any case extremely limited, resulting in better directional intensity of the incident sunlight on the sensor even with a simple design. In order to cover the entire hemisphere above the vehicle, a sun sensor is advantageously mounted in the area of each of two exterior mirrors on opposite sides of the motor vehicle, wherein the sensor arrangement is preferably located in the upper part of the exterior mirror facing toward the hemisphere.

In another embodiment, the sun sensors are designed with two zones (dual zone sensors). If the inventive sensor arrangement includes one sun sensor, this makes it possible to subdivide the hemisphere into two quadrants. If dual zone sensors are used on two opposite sides of the motor vehicle, it is possible according to the invention to subdivide the hemisphere under observation into four quadrants. This subdivision into four regions or quadrants corresponds to the division in high-quality air conditioning systems that allow individual climate control of four areas in the passenger compartment of the motor vehicle: driver, front passenger, left and right back seats.

It is possible for each of the sun sensors to be inset in transparent areas of the housing of the exterior mirror. This allows the sun sensors to be positioned with no adverse effect on the design possibilities for the motor vehicle. Usable transparent areas include those provided for existing components such as directional signals, for example.

Further installation locations for the sensor arrangement within the exterior mirror include, for example, the top of the exterior mirror facing away from the road, or a side facing away from the motor vehicle.

A sun sensor with which the spatial area under observation is divided into two separately evaluated zones is referred to as a dual zone sensor. Such a sensor normally has two individual sensors, which include photodiodes, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the FIGURE illustrates a top view of a motor vehicle with a fundamental inventive sensor arrangement.

DETAILED DESCRIPTION

Figure 1:
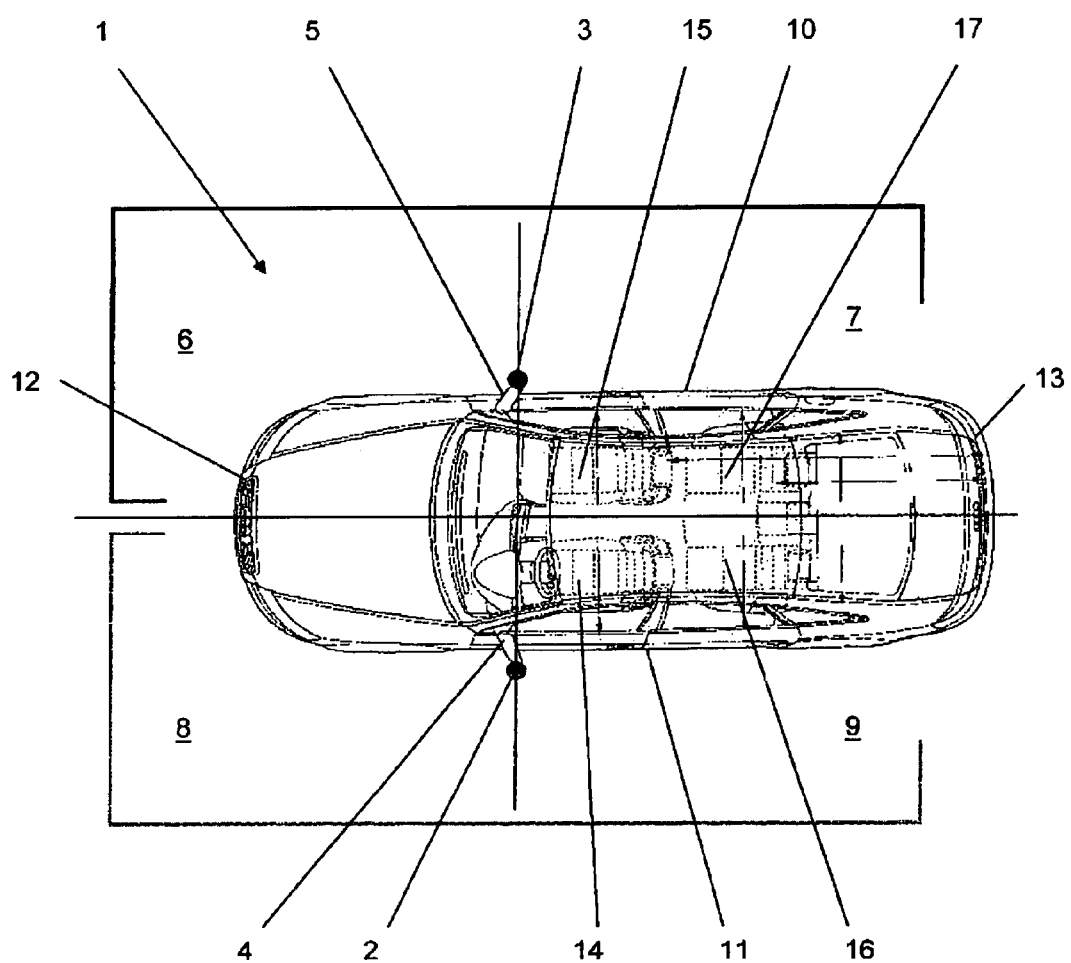

FIG. 1 shows a motor vehicle 1 with a sensor arrangement 2 in the exterior mirror 4 and a sensor arrangement 3 in the exterior mirror 5. The sensor arrangements 2 and 3 are dual zone sun sensors, each of which is used to effect a subdivision of the hemisphere of the coverable spatial region 6, 7, 8, 9 into two separate zones 6 and 7 or 8 and 9. As a result, it is possible to measure in the direction of the forward 12 and rear 13 vehicle areas on each side 10, 11 of the motor vehicle.

As a result of this positioning of the sun sensors 2, 3, the hemisphere under observation is subdivided into four quadrants 6, 7, 8, 9. The sensor arrangement 3 in the exterior mirror 5 covers the quadrants 6 and 7, while the sensor arrangement 2 in the left exterior mirror 4 covers the quadrants 8 and 9. This corresponds in an optimal way to the division of the passenger compartment of the motor vehicle into the areas driver seat 14, front passenger seat 15, and left 16 and right 17 back seats.

The sensor arrangement 2, 3, working in conjunction with a control system of an air conditioner located in the motor vehicle, is thus capable of separately air-conditioning the individual passenger compartment areas 14, 15, 16 and 17 of the motor vehicle. Independently of this very detailed subdivision of the motor vehicle passenger compartment, an air conditioning system that divides the passenger compartment into two areas, namely the driver side 14, 16 and passenger side 15, 17 can be regulated very easily. As a result of intense sunlight incident on the driver side 14, 16 of the motor vehicle 1 while the sensor arrangement 3 is exposed to shadow, for example, the air conditioning system could cool the driver side 14, 16 more strongly than the passenger side 15, 17, which is not exposed to direct sunlight.

The invention is not limited to the design shown in the example embodiment. In particular, the number of sun sensors 2, 3, and also their position in the exterior mirror 3, 4 of the motor vehicle 1, can vary. In addition, it is possible to use sun sensors other than single/dual zone sun sensors, for example four-zone sun sensors.

Moreover, it is likewise possible in accordance with the invention to integrate a printed circuit board with electronic elements or receptacles with electrical terminals and additional sensors into the sensor arrangement 2, 3 having one or more sensors 2, 3. For example, it is possible here to integrate a temperature sensor and/or to use an ambient light sensor in the sensor arrangement 2, 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor arrangement for a motor vehicle, the sensor arrangement including:
    a first sun sensor disposed on a first exterior side view mirror of the motor vehicle;
    a second sun sensor disposed on a second exterior side view mirror of the motor vehicle, said second exterior side view mirror being disposed on a side of the motor vehicle opposite said first side view mirror;
    an air conditioner disposed at an interior of the motor vehicle, said air conditioner including a control system; and
    an operable link between said first and second sun sensors, said control system, and said air conditioner, said operable link extending from sensor positions at an exterior of the motor vehicle to an air conditioner position at said interior of the motor vehicle.

2. The sensor arrangement of claim 1, wherein said sensors are dual zone sensors.

3. The sensor arrangement of claim 1, wherein a monitorable hemisphere is subdivided into four quadrants by the sun sensors.

4. The sensor arrangement of claim 1, wherein an additional sensor, a temperature sensor, and/or an ambient light sensor, is integrated in the sensor arrangement.

* * * * *